United States Patent
Riley et al.

(10) Patent No.: US 8,260,086 B2
(45) Date of Patent: Sep. 4, 2012

(54) SYSTEM AND METHOD FOR FUSION OF IMAGE PAIRS UTILIZING ATMOSPHERIC AND SOLAR ILLUMINATION MODELING

(75) Inventors: Ronald A. Riley, Melbourne, FL (US); Tariq Bakir, Melbourne, FL (US); Eric Spellman, Viera, FL (US); Robert Kaiser, Melbourne, FL (US)

(73) Assignee: Harris Corporation, Melbourne, FL (US)

(*) Notice: Subject to any disclaimer, the term of this patent is extended or adjusted under 35 U.S.C. 154(b) by 712 days.

(21) Appl. No.: 12/399,364

(22) Filed: Mar. 6, 2009

(65) Prior Publication Data

US 2010/0226570 A1  Sep. 9, 2010

(51) Int. Cl.
G06K 9/32 (2006.01)
(52) U.S. Cl. ........ 382/294; 382/191; 382/299; 382/100; 382/300
(58) Field of Classification Search .......... 382/294, 382/191, 100, 299, 300; 392/294, 191, 100, 392/299, 300
See application file for complete search history.

(56) References Cited

U.S. PATENT DOCUMENTS

| | | | |
|---|---|---|---|
| 5,034,986 A | | 7/1991 | Karmann et al. |
| 5,265,172 A | * | 11/1993 | Markandey et al. .......... 382/107 |
| 5,324,113 A | | 6/1994 | Ingram, Jr. et al. |
| 5,627,905 A | | 5/1997 | Sebok et al. |
| 5,680,487 A | | 10/1997 | Markandey |
| 5,884,226 A | | 3/1999 | Anderson et al. |
| 5,949,914 A | * | 9/1999 | Yuen .............................. 382/254 |
| 6,011,875 A | * | 1/2000 | Laben et al. ................... 382/276 |
| 6,097,835 A | * | 8/2000 | Lindgren ....................... 382/162 |
| 6,269,175 B1 | * | 7/2001 | Hanna et al. .................. 382/107 |
| 6,366,681 B1 | * | 4/2002 | Hutchins ....................... 382/110 |
| 6,484,099 B1 | * | 11/2002 | Holzer-Popp et al. ............ 702/2 |
| 6,937,774 B1 | | 8/2005 | Specht et al. |
| 7,298,922 B1 | * | 11/2007 | Lindgren et al. .............. 382/294 |
| 7,340,099 B2 | * | 3/2008 | Zhang ........................... 382/191 |

(Continued)

FOREIGN PATENT DOCUMENTS

CA    2670611 A1    6/2008

(Continued)

OTHER PUBLICATIONS

Synthesis—Physics, Thomas et al., IEEE, 0196-2892, 2008, pp. 1301-1312.*

(Continued)

*Primary Examiner* — Jayesh A Patel
(74) *Attorney, Agent, or Firm* — Fox Rothschild, LLP; Robert J. Sacco

(57) ABSTRACT

A method for processing imagery includes receiving data for a first image associated with a first spectral band and second images associated with second spectral bands. The method also includes obtaining first reflectance functions for pixels in the second images, generating a second reflectance function for pixels in the first image based on the first reflectance functions, and obtaining a third reflectance function for pixels in the first image based on the second reflectance function, the imagery data for the first image, and at least one facet orientation constraint. The method further includes modifying the first reflectance functions to generate fourth reflectance functions for pixels in the second images based on a difference between the second and the third reflectance functions, and computing imagery data defining third images associated with the second spectral bands and having the first spatial resolution based on the fourth reflectance functions.

20 Claims, 7 Drawing Sheets

U.S. PATENT DOCUMENTS

| | | | |
|---|---|---|---|
| 7,369,229 B2* | 5/2008 | Bissett et al. | 356/328 |
| 7,369,299 B2* | 5/2008 | Sakurai et al. | 359/296 |
| 7,400,770 B2 | 7/2008 | Keaton et al. | |
| 7,491,944 B1 | 2/2009 | Stork et al. | |
| 7,620,203 B1 | 11/2009 | Simmons et al. | |
| 8,111,307 B2* | 2/2012 | Deever et al. | 348/246 |
| 2001/0016053 A1* | 8/2001 | Dickson et al. | 382/110 |
| 2002/0096622 A1* | 7/2002 | Adler-Golden et al. | 250/208.1 |
| 2004/0075667 A1* | 4/2004 | Burky et al. | 345/589 |
| 2004/0130702 A1 | 7/2004 | Jupp et al. | |
| 2004/0141659 A1* | 7/2004 | Zhang | 382/284 |
| 2004/0164235 A1 | 8/2004 | Miller | |
| 2004/0264796 A1 | 12/2004 | Turner et al. | |
| 2005/0012035 A1* | 1/2005 | Miller | 250/226 |
| 2005/0094887 A1* | 5/2005 | Cakir et al. | 382/254 |
| 2005/0111754 A1* | 5/2005 | Cakir et al. | 382/284 |
| 2006/0126959 A1 | 6/2006 | Padwick et al. | |
| 2006/0269158 A1* | 11/2006 | O'Hara et al. | 382/254 |
| 2008/0037865 A1 | 2/2008 | Vetter et al. | |
| 2008/0037869 A1 | 2/2008 | Zhou | |
| 2008/0089558 A1 | 4/2008 | Vadon et al. | |
| 2008/0112649 A1 | 5/2008 | Chen et al. | |
| 2008/0129752 A1* | 6/2008 | Riley et al. | 345/629 |
| 2008/0131024 A1* | 6/2008 | Riley et al. | 382/284 |
| 2008/0131025 A1* | 6/2008 | Riley et al. | 382/284 |
| 2010/0002947 A1* | 1/2010 | Riley et al. | 382/254 |
| 2010/0008595 A1 | 1/2010 | Riley et al. | |
| 2010/0008598 A1* | 1/2010 | Riley et al. | 382/299 |
| 2010/0032557 A1 | 2/2010 | Schiller | |
| 2010/0189363 A1 | 7/2010 | Riley et al. | |

FOREIGN PATENT DOCUMENTS

| | | |
|---|---|---|
| WO | WO 98/41079 | 9/1998 |
| WO | WO 2006/065741 | 6/2006 |
| WO | WO 2008/067517 | 6/2008 |
| WO | WO 2008/070542 | 6/2008 |
| WO | WO 2008/070544 | 6/2008 |

OTHER PUBLICATIONS

Influence—Measurements, Ritcher et al., I EEE, 1545-598X, 2006, pp. 565-569.*

Combining—Instruments, John C Price., XP-002588220, 1987, pp. 119-128.*

Smoothing—Details, J. G. Liu, XP008110993, 2000, pp. 2-13.*

Information about Related Patents and Patent Applications, see section 6 of the accompanying Information Disclosure Statement Letter, which concerns Related Patents and Patent Applications, p. 5, section 6 of the transmittal letter filed on Sep. 27, 2011 contains related patent applications.

Aanaes, H., et al: "Spectrally Consistent Satellite Image Fusion With Improved Image Priors", 2006 7th Nordic Signal Processing Symposium (IEEE Cat. No. 06EX1392) IEEE Piscataway, NJ USA, Jun. 7, 2006-Jun. 9, 2006, pp. 14-17, XP002482502; ISBN: 1-4244-0413-4.

Ager; T.P., et al: "Geo-Positional Accuracy Evaluation of QuickBird Ortho-Ready Standard 2A Multispectral Imagery", Proceedings SPIE, Algorithms and Technologies for Multispectral, Hyperspectral, and Ultraspectral Imagery X, Aug. 12, 2004, pp. 488-499, XP040185047.

Aiazzi, B., et al: "Context-Driven Fusion of High Spatial and Spectral Resolution Images Based on Oversampled Multiresolution Analysis", IEEE Transactions on Geoscience and Remote Sensing, vol. 40, No. 10, Oct. 2002, pp. 2300-2312.

Becker, S., et al: 2005. "Determination and Improvement of Spatial Resolution for Digital Aerial Images", Proceedings of ISPRS Hannover Workshop 2005: High-Resolution Earth Imaging for Geospatial Information, unpaginated CD-ROM, 6p.

Beisl U.: "BDRF Correction in Hyperspectral Imagery", European Space Agency—Publications, 2001, XP002589098.

Beisl, U., et al: "Correction of Atmospheric and Bidirectional Effects in Multispectral ADS40 Images for Mapping Purposes", Internet, Intl. Arch. Photogramm. Remote SENS 2004, XP002588221, Retrieved from the Internet: URL:http://www2.geog.ucl.ac.uk/{mdisney/teaching/PPRS/PPRS_5/orig/atmos_empirical.pdf [retrieved on Jun. 14, 2010].

Eismann, M.T. et al: "Hyperspectral Resolution Enhancement Using High-Resolution Multispectral Imagery With Arbitrary Response Functions", IEEE Transactions on Geoscience and Remote Sensing, IEEE Service Center, Piscataway, NJ, US., vol. 43, No. 3, Mar. 2005, pp. 455-465, ISSN: 0196-2892, p. 456-459.

Garzelli, A., et al: "Interband Structure Modeling for Pan-Sharpening of Very High-Resolution Multispectral Images", Information Fusion Elsevier USA, vol. 6, No. 3, Sep. 2005, pp. 213-224, XP004858824, ISSN: 1566-2535.

Hardie R.C., et al: "MAP Estimation for Hyperspectral Image Resolution Enhancement Using an Auxiliary Sensor", IEEE Transactions on Image Processing, vol. 13, No. 9, Sep. 2004, pp. 1174-1184.

Liu, J.G.: "Smoothing Filter Based Intensity Modulation: A Spectral Preserve Image Fusion Technique for Improving Spatial Details", Int. J. Remote Sensing, Dec. 2000, pp. 3461-3472, vol. 21, No. 18, XP008110993.

Khan, M.M. et al: "Indusion: Fusion of Multispectral and Panchromatic Images Using the Induction Scaling Technique", IEEE Geoscience and Remote Sensing Letters, IEEE Service Center, Jan. 1, 2008, pp. 98-102, vol. 5, No. 1, New York, New York US, XP011197256.

Perkins, T, et al.: "Retrieval of Atmospheric Properties from Hyper and Multispectral Imagery with the FLASH Atmospheric Correction Algorithm" SPIE, PO Box 10 Bellingham WA 98227-0010 USA, vol. 5979, Oct. 31, 2005, XP040211109.

Price J.C.: "Combining Panchromatic and Multispectral Imagery from Dual Resolution Satellite Instruments", Remote Sensing of Environment, No. 21, 1987, pp. 119-128, XP002588220.

Ranchin, T. et al al: "Image Fusion—The ARSIS Concept and Some Successful Implementation Schemes" ISPRS J. Photogramm. Remote SENS.; ISPRS Journal of Photogrammetry and Remote Sensing, Jun. 2003, vol. 58, No. 1-2, Jun. 2003, pp. 4-18, XP002469989.

Richter et al.: "Influence of the Adjacency Effect on Ground Reflectance Measurements", IEEE Geoscience and Remote Sensing Letters, IEEE Service Center, New York, NY, US, vol. 3, No. 4, , Oct. 1, 2006, pp. 565-569, XP011149586, ISSN 1545-598X.

Schiefer, S. et al: Correcting Brightness Gradient in Hyperspectral Data From Urban Areas, Remote Sensing of Environment, No. 101, 2006, pp. 25-37, XP002588219.

Schowengerdt, R.: "Remote Sensing: Models and Methods for Image Processing", Dec. 31, 2007, Academic Press, XP002558565, ISBN: 9780123694072.

Thomas C. et al: "Synthesis of Multispectral Images to High Spatial Resolution: A Critical Review of Fusion Methods Based on Remote Sensing Physics" IEEE Transactions on Geoscience and Remote Sensing, IEEE Service Center, Piscataway, NJ, US, vol. 46, No. 5, May 2008, pp. 1301-1312.

Zhang, Y: "Understanding Image Fusion", Photogrammetric Engineering & Remote Sensing, Jun. 2004, pp. 657-661.

Xu, C, et al: "Evaluation of the Surface Reflectance Retrieval on the Satellite Data", SPIE, PO Box 10, Bellingham WA 98227-0010 USA, vol. 6752, Aug. 8, 2007, XP040247396.

Kim, Y., et al: "An Experimental Study on the Image-Based Atmospheric Correction Method for High Resolution Multispectral Data", Geoscience and Remote Sensing Symposium, 2005, Igarss 2005, Proceedings, 2005 IEEE International Seoul, Korea, Jul. 25-29, 2005, pp. 434-436, vol. 1, Piscataway, New Jersey USA, XP010849008.

Bunting P et al: "An Area based Technique for Image-to-Image Registration of Multi-Modal Remote Sensing Data", Geoscience and Remote Sensing Symposium, 2008. IGARSS 2008. IEEE International, IEEE, Piscataway, NJ, USA, Jul. 7, 2008, pp. V-212, XP031423198.

Walli K C: "Automated multisensor image registration", Applied Imagery Pattern Recognition Workshop, 2003. Proceedings. 32nd Washington, DC, USA Oct. 5-17, 2003, Piscataway, NJ, USA, IEEE, Oct. 15, 2003, pp. 103-107, XP010695062.

Lemoigne J. et al: "Use of Multiresolution Wavelet Feature Pyramids for Automatic Registration of Multisensor Imagery", IEEE Transactions on Image Processing, IEEE Service Center, Piscataway, NJ, US, vol. 14, No. 6, Jun. 1, 2005, pp. 770-782, XP011131847.

Chi-Farn Chen et al: "Fully Automatic and Robust Approach for Remote Sensing Image Registration", Nov. 13, 2007, Progress in Pattern Recognition, Image Analysis and Applications; [Lecture Notes in Computer Science], Springer Berlin Heidelberg, Berlin, Heidelberg, pp. 891-900, XP019083038.

Alparone, L., et al. "Comparison of Pansharpening Algorithms: Outcome of the 2006 GRS-S Data-Fusion Contest," Geoscience and Remote Sensing, IEEE Transactions on Geoscience and Remote Sensing, vol. 45, No. 10, pp. 3012-3021, Oct. 2007 doi: 10.1109/TGRS.2007.904923.

Garzelli, A.; Nencini, F.; Capobianco, L.;, "Optimal MMSE Pan Sharpening of Very High Resolution Multispectral Images," Geoscience and Remote Sensing, IEEE Transactions on , vol. 46, No. 1, pp. 228-236, Jan. 2008 doi: 10.1109/TGRS.2007.907604 URL: http://ieeexplore.ieee.org/stamp/stamp.isp?tc=&arnumber=4389066&isnumber=4407619.

Yang, Y. et al., "An Overview on Pixel-Level Image Fusion in Remote Sensing," Automation and Logistics, 2007 IEEE International Conference on , vol., no., pp. 2339-2344, Aug. 18-21, 2007 doi: 10.1109/ICAL.2007.4338968 URL: http://ieeexplore.ieee.org/stamp/stamp.jsp?tp=&arnumber=4338968&isnumber=4338503.

Zheng, S., et al., "Remote Sensing Image Fusion Using Multiscale Mapped LS-SVM," Geoscience and Remote Sensing, IEEE Transactions on , vol. 46, No. 5, pp. 1313-1322, May 2008 doi: 10.1109/TGRS.2007.912737 URL: http://ieeexplore.ieee.org/stamp/stamp.jsp?tp=&arnumber=4444632&isnumber=4490048.

Joshi, M.; Jalobeanu, A., "Multiresolution Fusion in Remotely Sensed Images Using an IGMRF Prior and Map Estimation," Geoscience and Remote Sensing Symposium, 2008. IGARSS 2008. IEEE International , vol. 2, no., pp. II-269-11-272, Jul. 7-11, 2008 doi: 10.1109/IGARSS.2008.4778979.

* cited by examiner

SYSTEM AND METHOD FOR FUSION OF IMAGE PAIRS UTILIZING ATMOSPHERIC AND SOLAR ILLUMINATION MODELING

BACKGROUND OF THE INVENTION

1. Statement of the Technical Field

The invention concerns image processing, and more particularly, systems and methods for fusing image pairs based on modeling of atmospheric and solar illumination.

2. Description of the Related Art

In the field of remote image sensing, two common types of images include panchromatic imagery and multi-spectral imagery (MSI). Panchromatic imagery is obtained by a remote sensing device with a sensor designed to detect electromagnetic energy over one very broad band. This broad band typically includes most of the wavelengths of visible and near-infrared light. Panchromatic imagery has the advantage of offering very high spatial resolution. In contrast, multi-spectral imagery is typically created from several narrow spectral bands within the visible light region and the near infrared region. Consequently, a multi-spectral image is generally comprised of two or more image data sets, each created by sensors responsive to different portions of the optical spectrum (e.g., blue, green, red, and infrared). Multi-spectral images are advantageous because they contain spectral information which is not available from a similar panchromatic image. However, multi-spectral images typically have a lower spatial resolution as compared to panchromatic images.

It is often desirable to enhance a multi-spectral image with the high resolution of a panchromatic image and vice versa. Typically this process is referred to as "fusing" of the image pair. While several methods are available for fusing such image pairs, the resulting fused image from such methods typically results in an inaccurate representation of the color spectrum of the location being imaged. That is, conventional fusion processes tend to distort the color in the images. Accordingly, such methods generally result in fused images which are inadequate for certain types of applications. For example, in the case of image-based material classification, a higher fidelity is generally required that that provided by the conventional fusion of basic color multi-spectral bands (red, blue, green) with a panchromatic band. In particular, additional information from spectral bands that do not significantly overlap with the panchromatic band may be needed for material classification. Even worse, some portions of the visible multi-spectral bands may not be properly represented in the final image due to a limited overlap between the panchromatic band and one or more multi-spectral bands (e.g., blue). Some wavelet-based and statistical approaches are available to include this missing multi-spectral band information, but are generally prone to the introduction of artifacts, sensitive to variations in registration, geographic location, and or atmospheric conditions during imaging, and/or require extensive computations to generate a fused image.

SUMMARY OF THE INVENTION

Embodiments of the present invention provide systems and methods for processing remotely acquired imagery. In particular, systems and methods for fusing image pairs based on modeling of atmospheric and solar illumination. In a first embodiment of the present invention, a method for processing remotely acquired imagery is provided. The method includes the step of receiving imagery data defining a first image associated with a first spectral band and a plurality of second images associated with a plurality of second spectral bands, the first image having a first spatial resolution, and each of the second images having a second spatial resolution lower than the first spatial resolution. The method also includes the steps of obtaining a plurality of first reflectance functions, the plurality of first reflectance functions specifying reflectance values for pixels in the plurality of second images, generating a second reflectance function estimating reflectance values for pixels in the first image based on the plurality of first reflectance functions, and obtaining a third reflectance function specifying reflectance values for pixels in the first image based on the second reflectance function, the imagery data for the first image, and at least one facet orientation constraint. The method further includes modifying the plurality of first reflectance functions to generate a plurality of fourth reflectance functions specifying reflectance values for pixels in the plurality of second images, the modifying based on a difference between the second and the third reflectance functions, and computing imagery data defining a plurality of third images associated with the plurality of second spectral bands and having the first spatial resolution, the plurality of third images based on the plurality of fourth reflectance functions.

In a second embodiment of the present invention, a system for processing remotely acquired imagery. The system includes a storage element for receiving imagery data defining a first image associated with a first spectral band and a plurality of second images associated with a plurality of second spectral bands, the first image having a first spatial resolution, and each of the second images having a second spatial resolution lower than the first spatial resolution. The system also includes a processing element communicatively coupled to the storage element. In the system, the processing element is configured for obtaining a plurality of first reflectance functions, the plurality of first reflectance functions specifying reflectance values for pixels in the plurality of second images, generating a second reflectance function estimating reflectance values for pixels in the first image based on the plurality of first reflectance functions, and obtaining a third reflectance function specifying reflectance values for pixels in the first image based on the second reflectance function, the imagery data for the first image, and at least one facet orientation constraint. The processing element is also configured for modifying the plurality of first reflectance functions to generate a plurality of fourth reflectance functions specifying reflectance values for pixels in the plurality of second images, the modifying based on a difference between the second and the third reflectance functions, and computing imagery data defining a plurality of third images associated with the plurality of second spectral bands and having the first spatial resolution, the plurality of third images based on the plurality of fourth reflectance functions.

In a third embodiment of the present invention, a computer-readable medium, having stored thereon a computer program for processing remotely acquired imagery, is provided. The computer program includes a plurality of code sections executable by a computer for causing the computer to: receive imagery data defining a first image associated with a first spectral band and a plurality of second images associated with a plurality of second spectral bands, the first image having a first spatial resolution, and each of the second images having a second spatial resolution lower than the first spatial resolution; obtain a plurality of first reflectance functions, the plurality of first reflectance functions specifying reflectance values for pixels in the plurality of second images; generate a second reflectance function estimating reflectance values for pixels in the first image based on the plurality of first reflectance functions; obtain a third reflectance function specifying reflectance values for pixels in the first image based on the second reflectance function, the imagery data for the first image, and at least one facet orientation constraint; modify the plurality of first reflectance functions to generate a plurality of fourth reflectance functions specifying reflectance values for pixels in the plurality of second images, the modifying based on a difference between the second and the third reflectance functions; and compute imagery data defining a plurality of third images associated with the plurality of second spectral bands and having the first spatial resolution, the plurality of third images based on the plurality of fourth reflectance functions.

DETAILED DESCRIPTION

Figure 1:
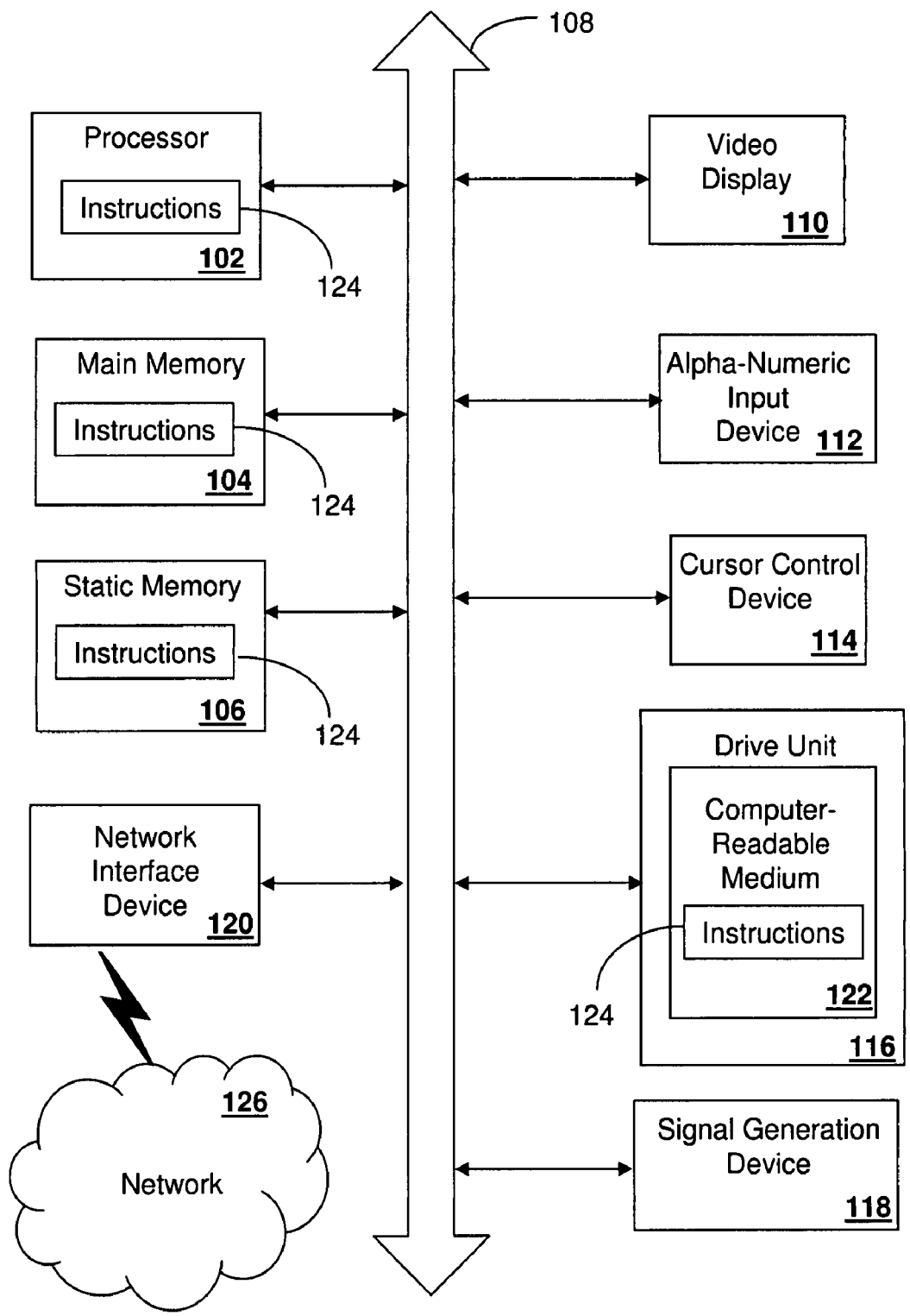
FIG. 1 is a schematic view of a computer system within which a set of instructions operate according to an embodiment of the invention.

Embodiments of the present invention provide systems and methods for processing remotely acquired imagery. In particular, the various embodiments of the present invention provide systems and methods for improving the color spectrum in fused images based on remotely acquired image pairs. Existing fusion methods generally result in fused images with distortion in color as a result of the variations in the amount of overlap between the spectrum of the multi-spectral (MSI) images obtained and the spectrum of the panchromatic image obtained. Furthermore, methods compensating for such variations in the spectrum overlap are generally computationally intensive, overly sensitive to variations in image acquisition, or typically generate undesirable artifacts. There are a number of methods which transform MSI images in an attempt to separate color from brightness, up-sample to a resolution of an associated panchromatic image, modulated the brightness based on the panchromatic image, and then invert the transform to provide a fused product. The color distortions of these methods are a result of the choices of color transformation and brightness modulation being unrealistic for remotely sensed imagery.

To overcome these limitations, embodiments of the present invention provide systems and methods for fusing remote imagery data based on reflectance information extracted from radiance values typically associated with imagery data. In particular, the various embodiments of the present invention provide a new imagery fusion technique in which it is assumed that the reflectance of the surface imaged varies relatively slower with respect to position than with respect to surface orientation. That is, rapid changes in brightness are attributed to variations in illumination due to facet orientation. Consequently, the atmosphere and solar illumination of a location being imaged can be modeled based on meta-data commonly recorded during conventional image acquisition. The model can then be used to atmospherically correct the MSI radiance to reflectance of the imaged surface.

In the various embodiments of the present invention, the brightness of the radiance in the model is modulated by how well the facets on the surface are oriented with the sun. For example, the sun shines more brightly on facets whose normals point directly at the sun. Facets on the surface that are in the shadow of other objects, such as buildings, are therefore assumed to be illuminated primarily by the blue sky in the model. Therefore to atmospherically correcting the MSI images, an effective facet orientation is selected for each pixel to provide smoothened reflectances across all MSI images. These smoothed reflectances are then modulated by selecting facet orientation of each pixel of the panchromatic image to obtain the radiances for the MSI images at the full resolution of the panchromatic image. One of the advantages of this approach is its ability to accurately sharpening of bands outside the spectral range of the Pan.

As used herein, "remote imagery data" refers to any set of data defining an image pair. That is, the remote imagery data includes image data and any type of meta-data associated with a first and at least a second image to be combined. The image data is acquired from any remotely positioned sensor or imaging device. For example, the remote sensor can be positioned to operate on, by way of example and not limitation, an elevated viewing structure, an aircraft, a spacecraft, or man-made satellite. That is, the remote data is acquired from any position, fixed or mobile, that is elevated with respect to the imaged location. The image data can include light intensity data for an image acquired various sensors, each associated with a particular range of wavelengths (i.e., a spectral band). Therefore, in the various embodiments of the present invention, the remote imagery data can include multi-spectral (~4 bands), hyper-spectral (>100 bands), and/or panchromatic (visible band) image data.

Remote imagery data is generally assumed to have certain other characteristics. For example, the different images are typically acquired within a very short time frame of each other and from nearly the same position to reduce global registration errors. Still, it will be understood by those skilled in the art that the present invention can be utilized in connection with different images that do not necessarily satisfy this criteria, possibility with degraded results. Accordingly, image pairs can be obtained using differently positioned sensors, but can result in more complex registration processes, including more complex or multiple shifting, scaling, and rotation processes.

In the exemplary embodiments described below, the remote imagery data associated with an image pair includes a panchromatic image, a MSI image, and associated meta-data. The meta-data can include information suitable for facilitating the registration process, including any additional information regarding the sensor or the location being imaged. By way of example and not limitation, the meta-data includes information identifying a date and/or a time of image acquisition, information identifying the geographic location being imaged, or information specifying a location of the sensor. For example, information identifying the geographic location being image can include geographic coordinates for the four corners of a rectangular image can be provided in the meta-data. The meta-data can also include the radiometric calibration for converting digital numbers of each band to radiance.

In general, registration or alignment of the pixels in the panchromatic and MSI images is needed in order to properly fuse the images. For example, a mapping functions are typically provided that map each pixel of MSI image to a pixel of panchromatic image and vice versa. For example pixels in the MSI image can be mapped to pixels in the panchromatic image using $x_p=M2P(x_m)$. Similarly, pixels in the panchromatic image can be mapped to pixels in the MSI image using $x_m=P2M(x_p)$. Such mapping functions can be generated based on meta-data or other methods, as described below. One of ordinary skill in the art will readily recognize that MSI images typically have a reduced spatial resolution as compared to panchromatic images. Accordingly, when mapping panchromatic image to a MSI image, multiple pixels of the panchromatic image are mapped to at least one common pixel in the MSI image. Similarly, when mapping the MSI image to panchromatic image, one pixel of the MSI image is mapped to multiple pixels of the panchromatic image.

Although the various exemplary embodiments are primarily described herein in terms of utilizing a panchromatic image to enhance the spatial resolution of a MSI image, these embodiments are provided for ease of illustration only and the present invention is not limited in this regard. The methods and system described here are equally applicable to image pairs comprising any types of images having different spatial and/or spectral resolutions.

The various embodiments of present invention are specifically embodied as a method, a data processing system, and a computer program product for generating mapping functions for image pairs. Accordingly, the present invention can take the form as an entirely hardware embodiment, an entirely software embodiment, or any combination thereof. However, the invention is not limited in this regard and can be implemented in many other forms not described herein.

FIG. 1 is a schematic diagram of an embodiment of a computer system 100 for executing a set of instructions that, when executed, causes the computer system 100 to perform one or more of the methodologies and procedures described herein. In some embodiments, the computer system 100 operates as a standalone device. In other embodiments, the computer system 100 is connected (e.g., using a network) to other computing devices. In a networked deployment, the computer system 100 operates in the capacity of a server or a client developer machine in server-client developer network environment, or as a peer machine in a peer-to-peer (or distributed) network environment.

In the some embodiments, the computer system 100 can comprise various types of computing systems and devices, including a server computer, a client user computer, a personal computer (PC), a tablet PC, a laptop computer, a desktop computer, a control system, a network router, switch or bridge, or any other device capable of executing a set of instructions (sequential or otherwise) that specifies actions to be taken by that device. It is to be understood that a device of the present disclosure also includes any electronic device that provides voice, video or data communication. Further, while a single computer is illustrated, the phrase "computer system" shall be understood to include any collection of computing devices that individually or jointly execute a set (or multiple sets) of instructions to perform any one or more of the methodologies discussed herein.

The computer system 100 includes a processor 102 (such as a central processing unit (CPU), a graphics processing unit (GPU, or both), a main memory 104 and a static memory 106, which communicate with each other via a bus 108. The computer system 100 further includes a display unit 110, such as a video display (e.g., a liquid crystal display or LCD), a flat panel, a solid state display, or a cathode ray tube (CRT)). The computer system also includes an input device 112 (e.g., a keyboard), a cursor control device 114 (e.g., a mouse), a disk drive unit 116, a signal generation device 118 (e.g., a speaker or remote control) and a network interface device 120.

The disk drive unit 116 includes a computer-readable storage medium 122 on which is stored one or more sets of instructions 124 (e.g., software code) configured to implement one or more of the methodologies, procedures, or functions described herein. The instructions 124 reside, completely or at least partially, within the main memory 104, the static memory 106, and/or within the processor 102 during execution thereof by the computer system 100. The main memory 104 and the processor 102 also can constitute machine-readable media.

Those skilled in the art will appreciate that the computer system architecture illustrated in FIG. 1 is one possible example of a computer system. However, the invention is not limited in this regard and any other suitable computer system architecture can also be used without limitation.

For example, dedicated hardware implementations including, but not limited to, application-specific integrated circuits, programmable logic arrays, and other hardware devices can likewise be constructed to implement the methods described herein. Applications that can include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the exemplary system is applicable to software, firmware, and hardware implementations.

In accordance with various embodiments of the present invention, the methods described below can be stored as software programs in a computer-readable storage medium and can be configured for running on a computer processor. Furthermore, software implementations can include, but are not limited to, distributed processing, component/object distributed processing, parallel processing, virtual machine processing, which can also be constructed to implement the methods described herein.

Therefore, in some embodiments of the present invention, the present invention is embodied as a computer-readable storage medium containing instructions 124 or that receives and executes instructions 124 from a propagated signal so that a device connected to a network environment 126 sends or receive voice and/or video data and that communicate over the network 126 using the instructions 124. The instructions 124 are further transmitted or received over a network 126 via the network interface device 120.

While the computer-readable storage medium 122 is shown in an exemplary embodiment to be a single storage medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure.

The term "computer-readable medium" shall accordingly be taken to include, but not be limited to, solid-state memories such as a memory card or other package that houses one or more read-only (non-volatile) memories, random access memories, or other re-writable (volatile) memories; magneto-optical or optical medium such as a disk or tape; as well as carrier wave signals such as a signal embodying computer instructions in a transmission medium; and/or a digital file attachment to e-mail or other self-contained information archive or set of archives considered to be a distribution medium equivalent to a tangible storage medium. Accordingly, the disclosure is considered to include any one or more of a computer-readable medium or a distribution medium, as listed herein and to include recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same functions are considered equivalents.

Figure 2:
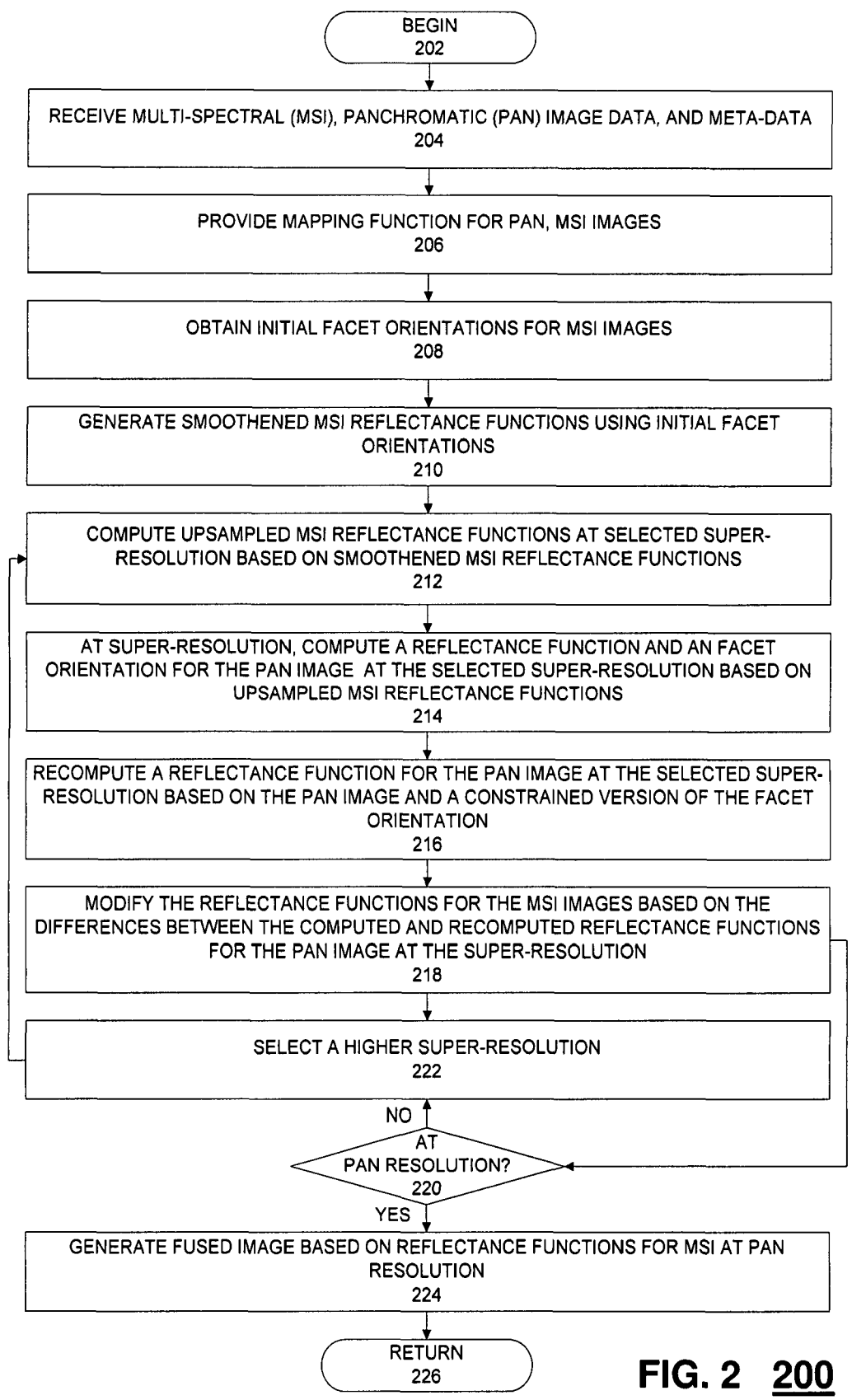
FIG. 2 is a flowchart of steps in an exemplary method for processing remotely acquired imagery to provide an improved color spectrum in fused images.

The present invention will now be described in greater detail in relation to FIG. 2, illustrating a flowchart of steps in an exemplary method 200 for processing remotely acquired imagery to provide an improved color spectrum in fused images according to an embodiment of the present invention. It should be appreciated, however, that the exemplary process disclosed in FIG. 2 is provided for purposes of illustration only and that the present invention is not limited in this regard.

As shown in FIG. 2, the method 200 can begin with step 202 and continue on to step 204. In step 204, an image pair is received comprising meta-data and imagery data for a geographic location being imaged. In exemplary method 200, the image pair defines a first image of a panchromatic type and a collection of second images associated with various MSI spectral bands for defining an MSI type image. Once the image pair is obtained in step 204, a mapping function for registering, i.e., aligning, the pixels in the image pair is created in step 206. In general, step 206 involves generating a mathematical function based on determining where each point in the panchromatic image maps to coordinates in the MSI image. A number of conventional methods exist for generating the mapping function. Typically, they involve selecting a number of points in one image, finding where they map to in the other image, and then optimizing the coefficients of a transform. This is usually a least squares error solution that permits one to obtain a set of coefficients that minimize the squared error of mapping points from one image to another. For best results in the fusing process, the panchromatic image is preferably mapped to the multi-spectral image with an accuracy defined by an error distance which is less than a dimension defined by 0.1 panchromatic pixel. The mapping function created in step 206 determines the mapping of points from the coordinates of one image to the coordinates of the other image. This mapping function can be as simple as a linear transformation of the form $x_1 = ax_2 + by_2 + x_0$, or a complex transformation modeling the geometry of both sensors and the surface imaged. The mapping function can be based on coordinates included within the imagery data as meta-data. For example, the meta-data can include latitude and longitude coordinates of the four corners of the acquired image pairs and the initial mapping function can be based on these coordinates. In some embodiments of the present invention, the meta-data can include a rational polynomial coefficient RPC sensor model which converts latitude, longitude, and elevation of the imaged surface to row/column image coordinates. These sensor models can also be used to produce accurate mappings between the images.

After the initial mapping function is created in step 206, an initial set of reflectance functions can be generated for each MSI band. That is, for each sensor, a function can be generated that provides reflectance values for each pixel in the MSI band image based on the radiance values of the pixels. Typically, the total radiance collected by a sensor is represented or modeled by the sum of an atmospheric reflected component and a surface reflected component. This is conceptually illustrated in FIG. 3.

Figure 3:
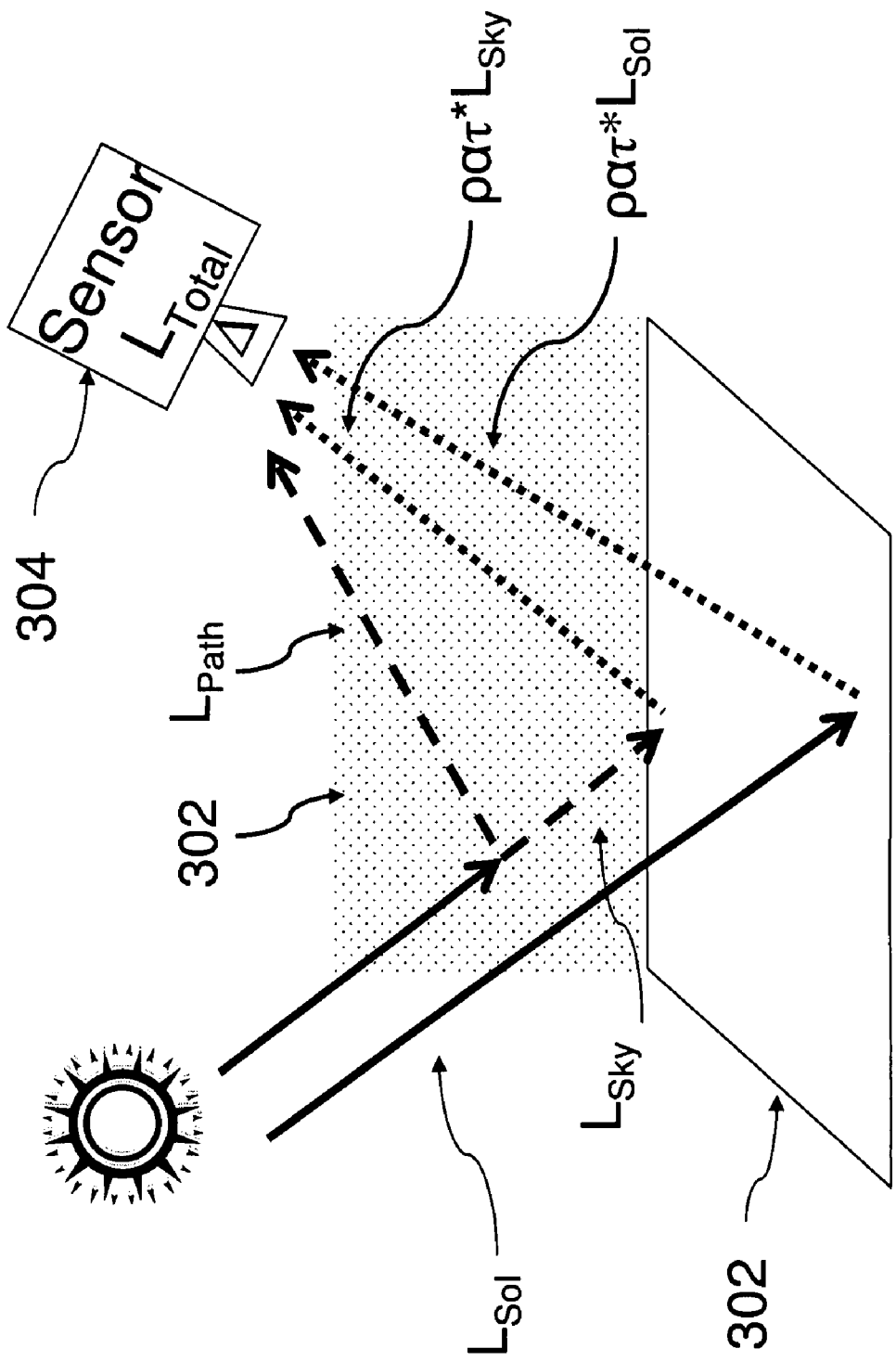
FIG. 3 is a conceptual illustration showing the various components of the radiance collected by a remote sensor.

As shown in FIG. 3, the sun or other light source provides a total amount of radiance $L_{Total\_Sol}$ directed to a surface 302 being imaged. A portion of this total radiance is reflected upwards by the atmosphere 304, resulting in a radiance $L_{Path}$ describing the upwelling path radiance. A second portion of this total radiance is reflected and/or scattered by the atmosphere 304 downwards towards the surface 302, resulting in a radiance $L_{Sky}$ describing the "blue-sky" radiance. A third portion of this total radiance reaches the surface 302, resulting in a radiance $L_{Sol}$ describing direct solar radiance on surface 302. Therefore, a sensor 306 ultimately detects a total radiance $L_{Total}$ based on the amount of upwelling path radiance $L_{Path}$ reaching the sensor 306 and the amount of direct solar radiance $L_{Sol}$ and blue-sky radiance $L_{Sky}$ reflected by the surface 302 and reaching the sensor 306. Mathematically, this total radiance collected by a sensor for a pixel can be described as follows in equation (1):

$$L_{Total}(\lambda) \approx L_{path}(\lambda) + \rho(\lambda)[L_{Solar}(\lambda)\cos(A) + L_{Sky}(\lambda)], \quad (1)$$

where:
$L_{path}(\lambda)$ is the path radiance collected by the sensor,
$\rho(\lambda)$ is the surface reflectance for a particular wavelength of light,
$L_{Solar}(\lambda)$ is the surface reflected direct solar radiance,
$L_{Sky}(\lambda)$ is the surface reflected blue-sky radiance, and
$\cos(A)$ is the dot product of the surface normal with the solar unit vector.

Equation (1) can rearranged to mathematically describe the reflectance at a pixel for each wavelength of light based on the radiances in the MSI image as follows in equation (2):

$$\rho(\lambda) \approx [L_{Total}(\lambda) - L_{path}(\lambda)] / [\cos(A)L_{Solar}(\lambda) + L_{Sky}(\lambda)]. \quad (2)$$

Referring back to FIG. 2, equation (2) can be utilized to determine a set of reflectance functions for the MSI images. However, resulting reflectance functions are typically complex. That is, although reflectance is constant for the surfaces of different objects or materials, the reflectance at a border region between the surfaces is typically discontinuous, resulting in a complex function required to accurately represent the reflectance. Therefore, in the various embodiments of the present invention, to reduce complexity in the reflectance functions, an approximated reflectance function can be instead generated in which these discontinuities are removed. This can be accomplished by adjusting a facet orientation to attenuate the discontinuities in the reflectance functions at these border regions. To this end, equation (2) can rearranged to mathematically describe a facet orientation for a pixels based on the radiances in the MSI image as follows in equation (3):

$$\cos(A)_{i,j} \approx [L_{Total}(\lambda) - L_{path}(\lambda) - \rho(\lambda)L_{Sky}(\lambda)] \circ [\rho(\lambda)L_{Solar}(\lambda)] / \|\rho(\lambda)L_{Solar}(\lambda)\|^2. \quad (3)$$

However, considering that the typical MSI images consists of 3 to 4 images of ~2000×2000 pixels each, performing such adjustments of the facet orientation at the MSI resolution can be computationally intensive. Therefore, in the various embodiments of the present invention, a multi-resolution approach is used to provide the spatially smoothest reflectance with high computationally efficiency by reducing the number of fact orientations that need to be adjusted. Therefore, in step 208, the MSI radiance is down-sampled and an initial set of facet orientations is obtained. The down-sampling can be accomplished using various methods. For example, a 2× pyramid function an be used to lower the resolution of the MSI images to images that are only ~10 pixels wide. However, other sub-resolutions can be utilized in the various embodiments of the present invention. Accordingly, by down-sampling and reducing the number of pixels, an initial reflectance based on flat earth facet orientation can be quickly optimized to reflectance which is smooth across the entire image. In the 10-pixel by 10-pixel example described above, a smoothened reflectance can be obtained in approximately 10 iterations. At a sub-resolution, the reflectance of each of the MSI images is blurred, and the facet orientation is estimated from the MSI radiance based on the current estimates of the reflectance. In the various embodiments of the present invention, the facet orientation is limited to the valid range (0,1) and the reflectance of each band is estimated from the MSI radiance based on the updated facet orientation Details of the generation of the initial facet orientations will be described below in greater detail with respect to FIG. 6.

As used herein, "up-sampling" refers to adjustment of the resolution of an image from lower to a higher resolution. Similarly, "down-sampling" refers to adjustment of the resolution of an image from a higher to a lower resolution. Although any methods for adjusting resolution of an image can be used in the various embodiments of the present invention, a single method can be utilized to provide a constant scaling of image resolution.

Once initial facet orientations are obtained in step 208, reflectance functions are generated for each of the MSI spectral bands at the MSI resolution at step 210. That is, the initial facet orientations obtained in step 208 are used to derive the reflectance functions for each of the MSI bands. Furthermore, any remaining discontinuities in the MSI reflectance functions can also be eliminated at step 210. In particular a smoothing, such as that described below for FIG. 7 can be performed. Although normally the removal of such discontinuities would be computationally intensive at the MSI resolution, the initial facet orientations generated at step 208 have already been adjusted to attenuate the more significant discontinuities. Accordingly, the number of remaining discontinuities at step 210 is low, reducing the amount of refinement needed for the reflectance functions and the facet orientations.

Once the smoothened reflectance functions at the MSI resolution have been obtained in step 210, the smoothened reflectance functions can be up-sampled to at least one super-resolution in step 212 to begin further refinement based on the panchromatic image data. That is, the reflectance functions are up-sampled to a resolution above the MSI resolution. Although the super-resolution can be the panchromatic resolution, attempting to perform refinement of the reflectance functions at the panchromatic image can be computationally intensive, as the typical panchromatic image can include ~8000×8000 pixels. Accordingly, to reduce computation requirements, the smoothed MSI reflectance functions can instead be up-sampled to an intermediate resolution between the MSI and panchromatic resolutions so that refinements can be performed iteratively by limiting the number of pixels.

After the MSI reflectance functions are up-sampled to the super-resolution in step 212, an approximated reflectance function for the panchromatic image can be generated in step 214. In the various embodiments of the present invention, an approximated reflectance function can be generated in the same way an approximated panchromatic image is generated from an MSI image. In the case of MSI images, the approximated panchromatic radiance values are generated from the combination of MSI radiance values calibrated to accurately correspond to the reflectance values of pixels for the panchromatic image. In the various embodiments of the present invention, the spectral weights for the reflectance functions and the radiance values are the same, as reflectance and radiance are proportional, as shown in equation (2).

Figure 4:
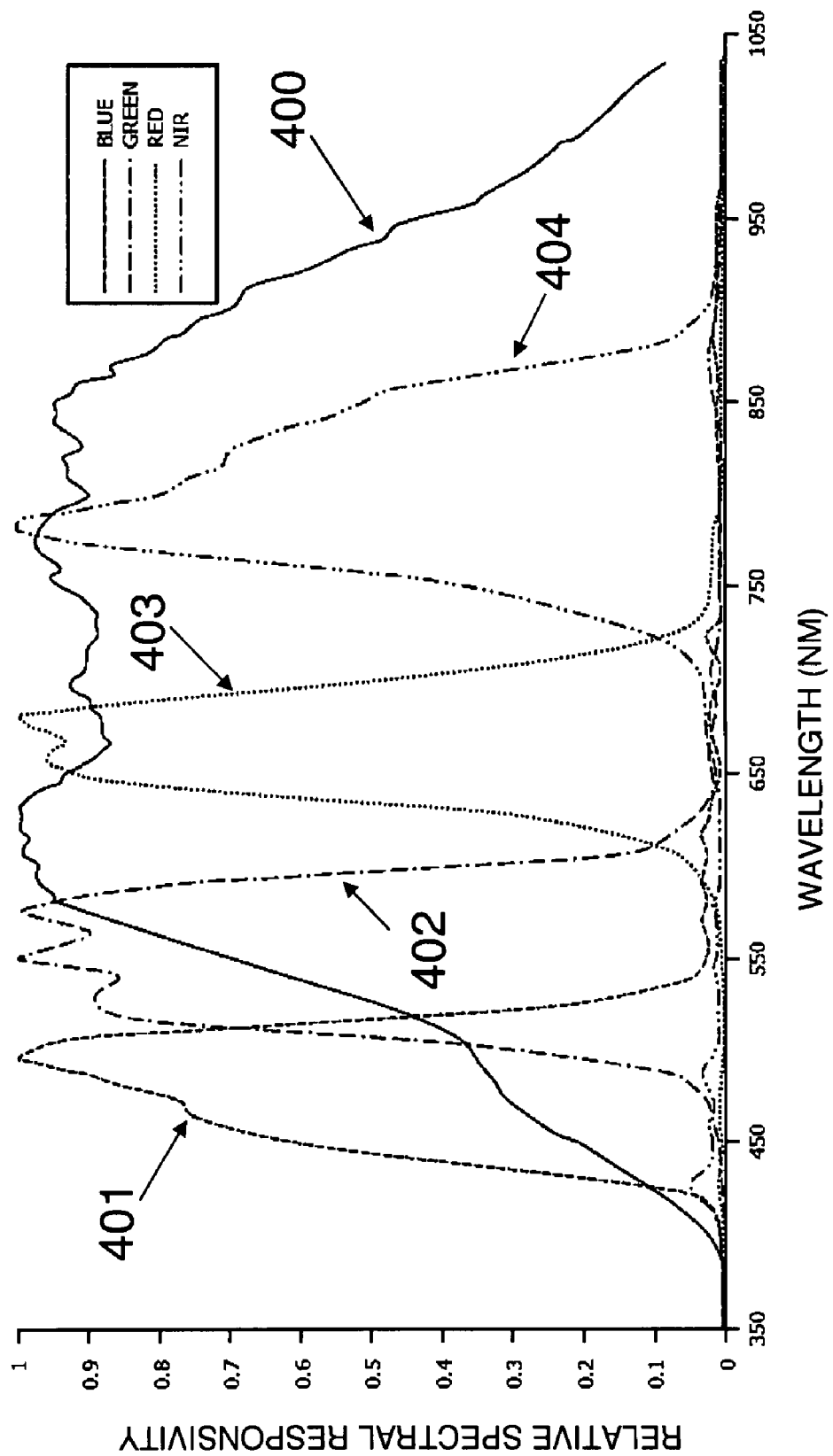
FIG. 4 is a plot showing an example of a spectral response of sensors used to create a panchromatic image and a multi-spectral image.

To determine the spectral weights, one of ordinary skill in the art will recognize that a complete multi-spectral image of a particular geographic is typically comprised of several optical or spectral image bands. In each of these bands, the sensor is responsive to a very limited range of optical wavelengths. This concept is illustrated in FIG. 4 which shows curves 401, 402, 403, 404 which represent a sensor's response to four different bands of optical wavelengths. The sensor essentially creates one image for each optical band represented by the response curves 401, 402, 403, 404. In this example, a single multi-spectral image would be comprised of images obtained by the sensor using these four spectral bands. Those skilled in the art will appreciate that different sensor systems can have more or fewer optical bands. In contrast, the panchromatic image is a single image which is obtained by a sensor that is responsive to a much wider range of optical wavelengths. In FIG. 4, the response of the panchromatic sensor is illustrated by curve 400.

Figure 5:
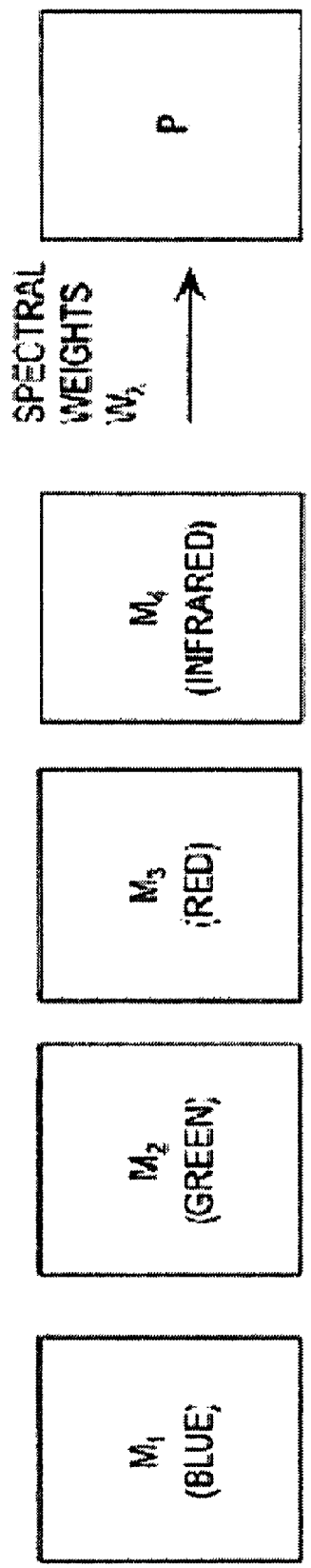
FIG. 5 is a conceptual illustration showing how spectral weights are used in a downscale processing of a multi-spectral image for decreasing the spectral resolution of the multi-spectral image.

In FIG. 4, it can be seen that the response curves 401, 402, 403, 404 of the sensor for the various multi-spectral bands can be very different as compared to the response curve 400 of the panchromatic sensor for the same wavelengths. These differences in the responsiveness of the sensor to the various optical bands will result in scaling differences as between the radiance values associated with each pixel for the multi-spectral image as compared to the panchromatic image. Therefore a calibration function is needed to scale the radiance values for each pixel as measured by the multi-spectral sensor to correspond to the scaling of radiance values resulting from the panchromatic sensor. For example, consider the spectral response represented by curves 400 and 401 at ~500 nm. The curve 401 has a spectral response of approximately 1.0 whereas the spectral response of the panchromatic sensor shows an average spectral response in the range of about 0.35. Ignoring for the moment the response of curve 402 in the wavelength range defined by curve 401, the radiance values for pixels in a multi-spectral image using a sensor having the characteristics of response curve 401 would likely need to be scaled by a weighting value of about 0.35 in order for such radiance values to be properly calibrated to those values measured by a sensor having the response indicated by curve 400. In general, proper spectral calibration would require that the pixel radiance values associated with each spectral band in FIG. 4 would need to be added together to obtain a total radiance value that is properly scaled to the radiance values obtained using a sensor having the response defined by curve 400. Accordingly, the spectral weights can be applied to radiance values to approximate the reflectance function for the panchromatic image at the super-resolution. This process is conceptually illustrated in FIG. 5. However, as previously described, the spectral weights can also be applied to the reflectance function to derive the panchromatic reflectance function. Therefore, in the various embodiments of the present invention, the process in FIG. 5 for the panchromatic reflectance functions can be expressed as follows in equation (4):

$$\rho_{Approx\_Pan}(i, j) \approx \sum_{\lambda} W_{\lambda} \rho_{\lambda}(i, j), \quad (4)$$

where:

$\rho_{Approx\_Pan}(i,j)$ is the approximated panchromatic reflectance value of each pixel;

$W_{\lambda}$ are the spectral weights for each of the spectral bands, $\lambda$; and $\rho_{\lambda}(i,j)$ is the radiance value for each pixel for each spectral band comprising the multi-spectral image.

Using these spectral weights, the approximated panchromatic reflectance function is generated in step 214. Additionally, based on down-sampled radiance values of the panchromatic image and the approximated panchromatic reflectance function, a panchromatic facet orientation can also be determined in step 214 based on, for example, equation (3). Once the approximated panchromatic reflectance and facet orientations are obtained in step 214, the panchromatic facet orientation can be constrained to real values and the panchromatic reflectance function can be recomputed in step 216. Details of this recomputation are described below with respect to FIG. 7. Once a recomputed reflectance function is obtained in step 216, the difference between the approximated and the recomputed reflectance functions can be used to adjust the MSI reflectance functions at step 218. Details of this adjustment are described below with respect to FIG. 8.

After the MSI reflectance functions at the super-resolution have been adjusted at step 218, the method 200 can check to see if further refinement is necessary. That is, if the super-resolution not at the panchromatic resolution at step 220, further refinement of the reflectance values is needed at a higher resolution. Therefore, at step 222 a next higher super-resolution can be selected, and steps 218-220 can be repeated for the next super-resolution. Once the super-resolution is at the panchromatic resolution at step 220, no further refinement of the MSI reflectance functions is needed and the fused image can be generated based on the reflectance functions up-sampled to the panchromatic resolution at step 224. The method 200 can then end at step 226 and resume previous processing.

Figure 6:
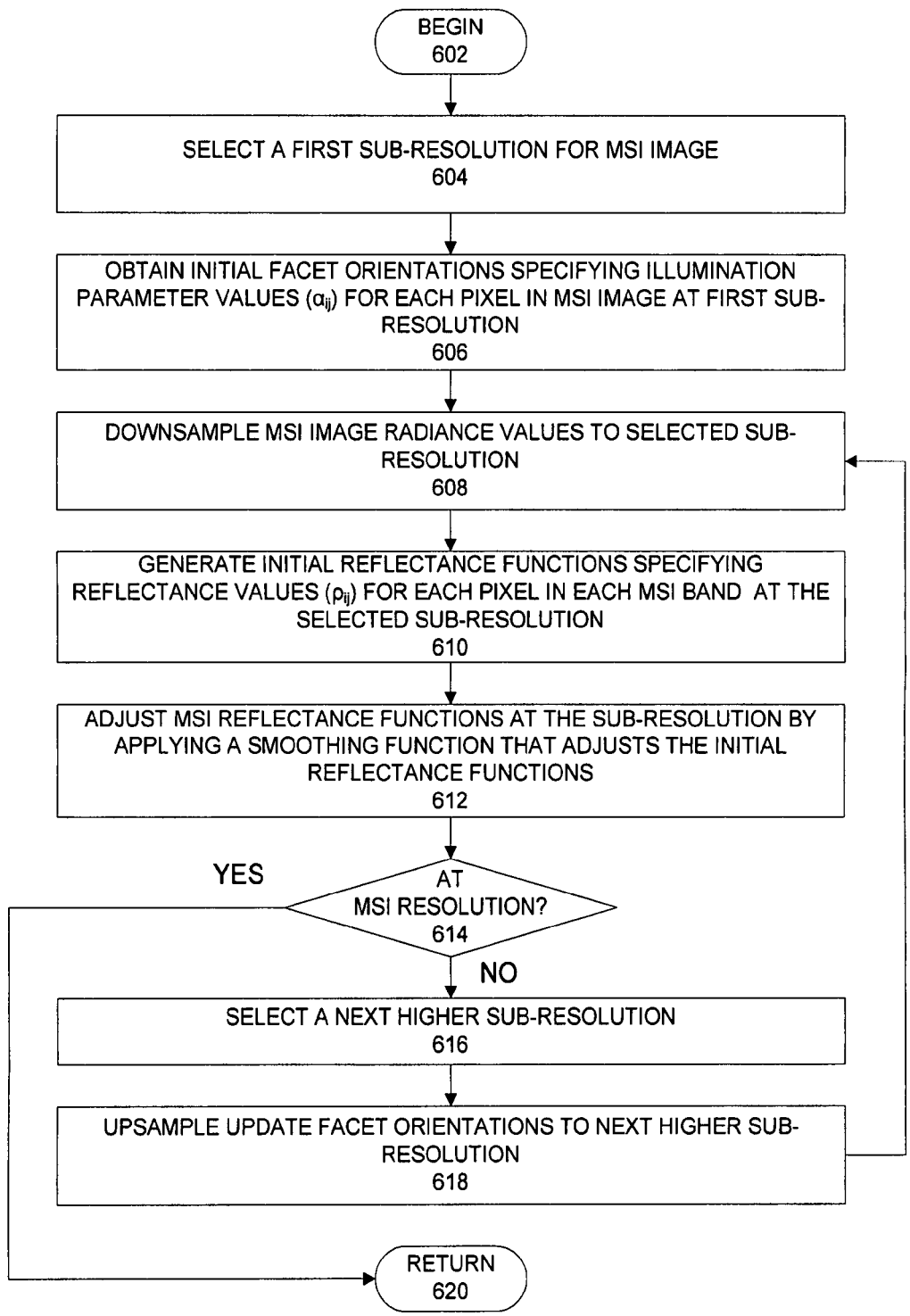
FIG. 6 is a flowchart of steps in an exemplary method for processing remotely acquired imagery to provide an improved color spectrum in fused images according to an embodiment of the present invention.

FIG. 6 shows a flow chart of an exemplary method 600 for generating initial facet orientations for the MSI bands according an embodiment of the present invention. Such a method can be performed, for example, during step 208 in FIG. 2. The method 600 can begin at step 602 and continue to step 604. In step 604, a first sub-resolution can be selected. That is, a spatial resolution less than the spatial resolution of the MSI image. As previously described, computational requirements are reduced when the number of pixels is reduced via down-sampling processes. Afterwards in step 606, an initial facet orientation can be obtained at the selected sub-resolution. That is, initial estimates for the facet orientation values for each of the pixels in a MSI image. These initial estimates can be generated using the meta-data for the image pair and can be based on general lighting conditions of the imaged location. Subsequently or concurrently with step 606, the MSI image radiance values for each of the MSI bands can be down-sampled to the selected sub-resolution in step 608. The down-sampled radiance values and the initial estimate of the facet orientation values are used to compute the initial reflectance functions for each of the MSI bands at the sub-resolution at step 610. The initial reflectance functions can be computing using, for example, equation (2) or an atmospheric modeling system.

In general, even when facet orientation is constant over an area, the reflectance of objects will not vary continuously over the area. That is, a true reflectance function will result in discontinuities at the border between different objects. Unfortunately, such a function increases computational complexity. Accordingly, to simplify computation, the reflectance functions in the various embodiments of the present invention can be required to vary continuously. Therefore, in step 612 the reflectance functions obtained in step 610 can be smoothed to remove such discontinuities by adjusting the facet orientation. That is, the facet orientations are used as a tuning parameter for the smoothing function being applied to the reflectance functions. In the various embodiments of the present invention, any type of smoothing function or blurring operator can be utilized. However, although a relatively simple blurring operator, such as a simple box average will produce good results, accelerated convergence and higher resolutions can be achieved by using anisotropic smoothing operators. For example, the relative contribution of neighboring pixels in the blurring operator can be weighted according to the similarity of radiance values in the panchromatic image.

After reflectance functions at the selected sub-resolution are smoothened at the sub-resolution at step 612, the method 600 can determine if further refinement of the facet orientation is needed. In particular, if the selected sub-resolution is at the MSI image, no additional refinement of the facet orientations is required. Therefore, if at step 614, the sub-resolution is at the MSI resolution, the method can end at step 616 and resume previous processing. That is, the adjusted facet orientations can be used to determine the MSI reflectance functions at, for example, step 210 in FIG. 2. However, if the selected sub-resolution is not at the MSI resolution, a next higher sub-resolution can be selected at step 618. The facet orientations, adjusted at step 612, can then be up-sampled to the next higher sub-resolution and steps 608-614 can be repeated until the facet orientation is refined at the MSI resolution. Alternatively, in some embodiments of the present invention, the facet orientation can be refined until reaching a sub-resolution other than the MSI resolution, albeit requiring a final upscaling step to the MSI resolution.

Figure 7:
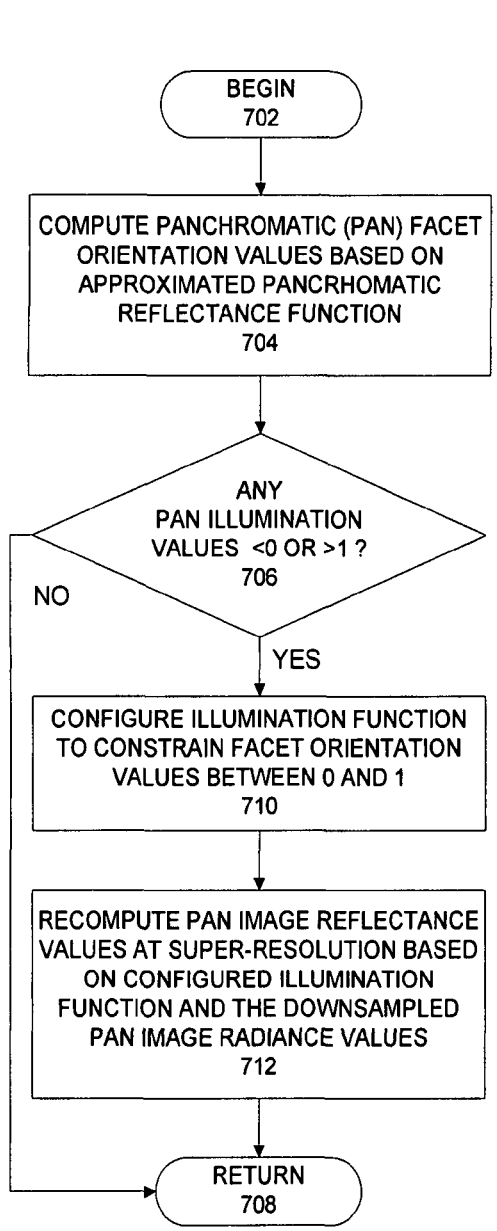
FIG. 7 is a flowchart of steps in an exemplary method for processing remotely acquired imagery to provide an improved color spectrum in fused images according to an embodiment of the present invention.

FIG. 7 shows a flow chart of an exemplary method 700 for recomputing the panchromatic reflectance function based on a constrained facet orientation according an embodiment of the present invention. For example, method 700 can be performed during step 216 in FIG. 2. The method 700 can begin at step 702 and continue to step 704. In step 704, the panchromatic facet orientation values are computed based on the approximated panchromatic reflectance function and the panchromatic radiance values. For example, step 704 can be performed using equation (3). Afterwards, if all of the panchromatic facet orientation values are within the range of 0 to 1, the method 700 can end at step 708 and resume previous processing. However, if at least one panchromatic facet orientation value outside the range of 0 and 1 is found at step 706, the method 700 continues instead to step 710.

In step 710, a constrained panchromatic facet orientation can be generated. That is, the panchromatic facet orientation is constrained to a value of 0 for pixels associated with facet orientation values less than 0 and to a value of 1 for pixels associated with facet orientation values greater than 1. Other values within the range of 0 to 1 are left undisturbed. Afterwards in step 712, a recomputed panchromatic reflectance function is generated based on the constrained facet orientation in step 710 and the radiance values from the panchromatic image. The method 700 can then end at step 708 and continue previous processing.

Figure 8:
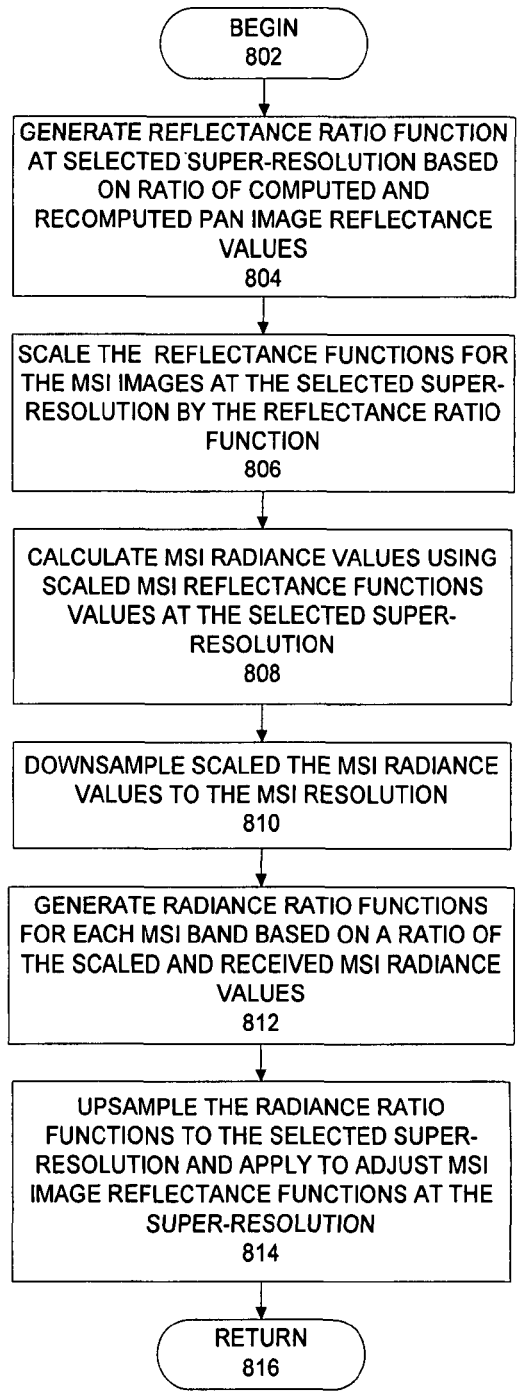
FIG. 8 is a flowchart of steps in an exemplary method for processing remotely acquired imagery to provide an improved color spectrum in fused images according to an embodiment of the present invention.

FIG. 8 shows a flow chart of an exemplary method 800 for adjusting the MSI reflectance functions at the MSI resolution based on the approximated and recomputed panchromatic reflectance functions obtained at a super-resolution according an embodiment of the present invention. The method 800 can be performed, for example, during step 218 in FIG. 2. The method 800 can begin at step 802 and continue to step 804. In step 804, a reflectance ratio function can be generated from the ratio of the recomputed panchromatic reflectance function and the approximated reflectance function. The reflectance ratio function therefore provides a ratio of reflectances associated with each pixel at the super-resolution. This reflectance ratio function effectively provides scaling factor that describe the amount of adjustment needed in the MSI reflectances so that the corresponding facet orientation values are within a proper range (0 to 1). However, this scaling factor is provided at the super-resolution and not at the MSI resolution and down-sampling of the scaling factor would normally be needed to adjust the values in the MSI image. These sensors collect imagery as radiance integrated over a limited solid angle for each pixel. Thus reflectance values at a super-resolution cannot typically be down-sampled without significant distortion due to the non-stationary illumination resulting from variations in facet orientation over the solid angle of the pixels in the MSI images. Images should be down-sampled as radiance values to be consistent with the physical model of the sensors. Therefore, in the various embodiments of the present invention, the adjustment of the MSI reflectance functions is performed by determining a scaling factor for the radiance at the MSI resolution based on the scaling factor of the reflectance at the super-resolution.

Accordingly, the MSI reflectance functions can be first scaled by the reflectance ratio function at step 806 to provide scaled reflectances values at the super resolution. The scaled reflectance function can then be used to generate MSI radiance values at the super-resolution in step 808. The MSI radiance values can be generated using the facet orientation values derived from the panchromatic image at the super-resolution. Once MSI radiance values, as previously described, provide a suitable set of values which can be down-sampled. Accordingly, at step 810, the MSI radiance values at the super-resolution are down-sampled to the MSI resolution. Afterwards, a radiance ratio function is generated at step 812. The radiance ratio at step 812 is based on a ratio of the MSI radiance values generated at step 808 and down-sampled at step 810 and the MSI radiance values in the MSI image. After the radiance ratio function is obtained at step 812, the radiance ratio function is up-sampled at step 814 to the super-resolution and applied to the fused radiance image at the super-resolution. The method can then end at step 816 to resume previous processing, such as producing a reflectance image using the corrected fused radiance or further upscaling of the corrected MSI reflectance functions for additional refinement.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments can be utilized and derived therefrom, such that structural and logical substitutions and changes can be made without departing from the scope of this disclosure. Figures are also merely representational and can not be drawn to scale. Certain proportions thereof may be exaggerated, while others may be minimized. Accordingly, the specification and drawings are to be regarded in an illustrative rather than a restrictive sense.

Such embodiments of the inventive subject matter can be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose can be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

We claim:

1. A method for processing remotely acquired imagery, comprising:
   receiving imagery data defining a first image associated with a first spectral band and a plurality of second images associated with a plurality of second spectral bands, said first image having a first spatial resolution, and each of said second images having a second spatial resolution lower than said first spatial resolution;
   obtaining a plurality of first reflectance functions, said plurality of first reflectance functions specifying reflectance values for pixels in each of said plurality of second images;
   generating a second reflectance function estimating reflectance values for pixels in said first image based on said plurality of first reflectance functions;
   obtaining a third reflectance function specifying reflectance values for pixels in said first image based on said second reflectance function, said imagery data for said first image, and at least one facet orientation constraint;
   modifying said plurality of first reflectance functions to generate a plurality of fourth reflectance functions specifying reflectance values for pixels in said plurality of second images, said modifying based on a difference between said second and said third reflectance functions; and
   computing imagery data defining a plurality of third images associated with said plurality of second spectral bands and having said first spatial resolution, said plurality of third images based on said plurality of fourth reflectance functions.

2. The method of claim 1, wherein said obtaining said plurality of said first reflectance functions comprises:
   down-sampling said imagery data for said plurality of second images to a third spatial resolution lower than said second spatial resolution;
   receiving one or more facet orientations specifying facet orientation values for said pixels in said plurality of said second images at said third spatial resolution;
   generating a plurality of initial reflectance functions specifying said reflectance values for said pixels in said plurality of second images at said third spatial resolution, said plurality of initial reflectance functions based on said facet orientations and said imagery data for said second image at said third spatial resolution;

smoothing said plurality of initial reflectance functions to produce a plurality of updated reflectance functions specifying said reflectance of said pixels in each of said plurality of second images at said third spatial resolution; and providing said plurality of updated reflectance functions as said plurality of first reflectance functions.

3. The method of claim 2, wherein said smoothing further comprises updating said facet orientations based on said plurality of updated reflectance functions and said imagery data for said second image at said third spatial resolution, and wherein said obtaining said plurality of first reflectance functions further comprises:

prior to said providing said plurality of updated reflectance functions, down-sampling said imagery data for said plurality of second images to a fourth spatial resolution lower than said second spatial resolution and greater than said third spatial resolution, adapting said facet orientations to said fourth spatial resolution, and repeating said generating and said smoothing.

4. The method of claim 1, wherein said generating said second reflectance function further comprises:

adapting said plurality of first reflectance functions to a third spatial resolution greater than said second spatial resolution;

determining a plurality of spectral weights, each of said plurality of spectral weights associated with one of said plurality of second spectral bands; and computing a combination of said plurality of first reflectance functions at said third spatial resolution to produce said second reflectance function, each of said plurality of first reflectance functions scaled by said associated one of said plurality of spectral weights in said combination.

5. The method of claim 4, wherein said obtaining said third reflectance function further comprises:

down-sampling said imagery data for said first image to said third spatial resolution;

generating a facet orientation specifying facet orientation values for said pixels in said first image at said third spatial resolution based on said imagery data for said first image at said third spatial resolution and said second reflectance function;

configuring said facet orientation values in said facet orientation to meet said facet orientation constraint; and computing said third reflectance function based on said imagery data for said first image at said third spatial resolution and said facet orientation.

6. The method of claim 5, wherein said modifying said plurality of first reflectance functions further comprises:

generating a reflectance ratio function, said reflectance ratio function comprising a ratio of said third reflectance function and said second reflectance function;

computing imagery data defining a plurality of fourth images associated with said plurality of second spectral bands and having said third spatial resolution, said plurality of fourth images based on said plurality of second images, said reflectance ratio function, and said facet orientation providing valid facet orientation values;

down-sampling said plurality of fourth images to said second spatial resolution; and generating a plurality of radiance ratio functions at said second resolution associated with each of said second spectral bands, each of said plurality of radiance ratio functions comprising a ratio of said imagery data for a one of said plurality of fourth images at said second spatial resolution and a one of said plurality of second images at said second spatial resolution associated with a one of said plurality of second spectral bands;

upscaling said plurality of radiance ratio functions to said third spatial resolution to provide a plurality of up-sampled radiance ratio functions;

applying said plurality of up-sampled radiance ratio functions to said plurality of first reflectance functions at said third spatial resolution to produce said plurality of fourth reflectance functions.

7. The method of claim 1, further comprising:

prior to said computing, selecting said plurality of fourth reflectance functions as said plurality of first reflectance functions; and repeating said generating, said obtaining, and said modifying steps.

8. A system for processing remotely acquired imagery, comprising:

a storage element for receiving imagery data defining a first image associated with a first spectral band and a plurality of second images associated with a plurality of second spectral bands, said first image having a first spatial resolution, and each of said second images having a second spatial resolution lower than said first spatial resolution; and a processing element communicatively coupled to the storage element, said processing element configured for:

obtaining a plurality of first reflectance functions, said plurality of first reflectance functions specifying reflectance values for pixels in said plurality of second images, generating a second reflectance function estimating reflectance values for pixels in said first image based on said plurality of first reflectance functions, obtaining a third reflectance function specifying reflectance values for pixels in said first image based on said second reflectance function, said imagery data for said first image, and at least one facet orientation constraint, modifying said plurality of first reflectance functions to generate a plurality of fourth reflectance functions specifying reflectance values for pixels in said plurality of second images, said modifying based on a difference between said second and said third reflectance functions, and computing imagery data defining a plurality of third images associated with said plurality of second spectral bands and having said first spatial resolution, said plurality of third images based on said plurality of fourth reflectance functions.

9. The system of claim 8, wherein said processing element is further configured during said obtaining said plurality of said first reflectance functions for:

down-sampling said imagery data for said plurality of second images to a third spatial resolution lower than said second spatial resolution, receiving one or more facet orientations specifying facet orientation values for said pixels in said plurality of said second images at said third spatial resolution, generating a plurality of initial reflectance functions specifying said reflectance values for said pixels in said plurality of second images at said third spatial resolution, said plurality of initial reflectance functions based on said facet orientations and said imagery data for said second image at said third spatial resolution, smoothing said plurality of initial reflectance functions to produce a plurality of updated reflectance functions specifying said reflectance of said pixels in each of said plurality of second images at said third spatial resolution, and providing said plurality of updated reflectance functions as said plurality of first reflectance functions.

10. The system of claim 9, wherein said smoothing further comprises updating said facet orientations based on said plurality of updated reflectance functions and said imagery data for said second image at said third spatial resolution, and wherein said obtaining said plurality of first reflectance functions further comprises:
   prior to said providing said plurality of updated reflectance functions, down-sampling said imagery data for said plurality of second images to a fourth spatial resolution lower than said second spatial resolution and greater than said third spatial resolution,
   adapting said facet orientations to said fourth spatial resolution, and
   repeating said generating and said smoothing.

11. The system of claim 8, wherein said processing element is further configured during said generating said second reflectance function for:
   adapting said plurality of first reflectance functions to a third spatial resolution greater than said second spatial resolution;
   determining a plurality of spectral weights, each of said plurality of spectral weights associated with one of said plurality of second spectral bands; and
   computing a combination of said plurality of first reflectance functions at said third spatial resolution to produce said second reflectance function, each of said plurality of first reflectance functions scaled by said associated one of said plurality of spectral weights in said combination.

12. The system of claim 11, wherein said processing element is further configured during said obtaining said third reflectance function for:
   down-sampling said imagery data for said first image to said third spatial resolution;
   generating a facet orientation specifying facet orientation values for said pixels in said first image at said third spatial resolution based on said imagery data for said first image at said third spatial resolution and said second reflectance function;
   configuring said facet orientation values in said facet orientation to meet said facet orientation constraint; and
   computing said third reflectance function based on said imagery data for said first image at said third spatial resolution and said facet orientation.

13. The system of claim 12, wherein said processing element is further configured during said modifying said plurality of first reflectance functions for:
   generating a reflectance ratio function, said reflectance ratio function comprising a ratio of said third reflectance function and said second reflectance function;
   computing imagery data defining a plurality of fourth images associated with said plurality of second spectral bands and having said third spatial resolution, said plurality of fourth images based on said plurality of second images, said reflectance ratio function, and said facet orientation providing valid facet orientation values;
   down-sampling said plurality of fourth images to said second spatial resolution; and
   generating a plurality of radiance ratio functions at said second resolution associated with each of said second spectral bands, each of said plurality of radiance ratio functions comprising a ratio of said imagery data for a one of said plurality of fourth images at said second spatial resolution and a one of said plurality of second images at said second spatial resolution associated with a one of said plurality of second spectral bands;
   upscaling said plurality of radiance ratio functions to said third spatial resolution to provide a plurality of up-sampled radiance ratio functions;
   applying said plurality of up-sampled radiance ratio functions to said plurality of first reflectance functions at said third spatial resolution to produce said plurality of fourth reflectance functions.

14. The system of claim 8, wherein said processing element is further configured for:
   prior to said computing, selecting said plurality of fourth reflectance functions as said plurality of first reflectance functions; and
   repeating said generating, said obtaining, and said modifying steps.

15. A non-transitory computer-readable medium, having stored thereon a computer program for processing remotely acquired imagery, the computer program comprising a plurality of code sections, the code sections executable by a computer for causing the computer to perform the steps of:
   receiving imagery data defining a first image associated with a first spectral band and a plurality of second images associated with a plurality of second spectral bands, said first image having a first spatial resolution, and each of said second images having a second spatial resolution lower than said first spatial resolution;
   obtaining a plurality of first reflectance functions, said plurality of first reflectance functions specifying reflectance values for pixels in said plurality of second images;
   generating a second reflectance function estimating reflectance values for pixels in said first image based on said plurality of first reflectance functions;
   obtaining a third reflectance function specifying reflectance values for pixels in said first image based on said second reflectance function, said imagery data for said first image, and at least one facet orientation constraint;
   modifying said plurality of first reflectance functions to generate a plurality of fourth reflectance functions specifying reflectance values for pixels in said plurality of second images, said modifying based on a difference between said second and said third reflectance functions; and
   computing imagery data defining a plurality of third images associated with said plurality of second spectral bands and having said first spatial resolution, said plurality of third images based on said plurality of fourth reflectance functions.

16. The non-transitory computer-readable medium of claim 15, wherein said obtaining said plurality of said first reflectance functions comprises:
   down-sampling said imagery data for said plurality of second images to a third spatial resolution lower than said second spatial resolution;
   receiving one or more facet orientations specifying facet orientation values for said pixels in said plurality of said second images at said third spatial resolution;
   generating a plurality of initial reflectance functions specifying said reflectance values for said pixels in said plurality of second images at said third spatial resolution, said plurality of initial reflectance functions based on said facet orientations and said imagery data for said second image at said third spatial resolution;
   smoothing said plurality of initial reflectance functions to produce a plurality of updated reflectance functions specifying said reflectance of said pixels in each of said plurality of second images at said third spatial resolution; and providing said plurality of updated reflectance functions as said plurality of first reflectance functions.

17. The non-transitory computer-readable medium of claim 16, wherein said smoothing further comprises updating said facet orientations based on said plurality of updated reflectance functions and said imagery data for said second image at said third spatial resolution, and wherein said obtaining said plurality of first reflectance functions further comprises:

prior to said providing said plurality of updated reflectance functions, down-sampling said imagery data for said plurality of second images to a fourth spatial resolution lower than said second spatial resolution and greater than said third spatial resolution, adapting said facet orientations to said fourth spatial resolution, and repeating said generating and said smoothing.

18. The non-transitory computer-readable medium of claim 15, wherein said generating said second reflectance function further comprises:

adapting said plurality of first reflectance functions to a third spatial resolution greater than said second spatial resolution;

determining a plurality of spectral weights, each of said plurality of spectral weights associated with one of said plurality of second spectral bands; and computing a combination of said plurality of first reflectance functions at said third spatial resolution to produce said second reflectance function, each of said plurality of first reflectance functions scaled by said associated one of said plurality of spectral weights in said combination.

19. The non-transitory computer-readable medium of claim 18, wherein said obtaining said third reflectance function further comprises: down-sampling said imagery data for said first image to said third spatial resolution; generating a facet orientation specifying facet orientation values for said pixels in said first image at said third spatial resolution based on said imagery data for said first image at said third spatial resolution and said second reflectance function; configuring said facet orientation values in said facet orientation to meet said facet orientation constraint; and computing said third reflectance function based on said imagery data for said first image at said third spatial resolution and said facet orientation.

20. The non-transitory computer-readable medium of claim 19, wherein said modifying said plurality of first reflectance functions further comprises:

generating a reflectance ratio function, said reflectance ratio function comprising a ratio of said third reflectance function and said second reflectance function;

computing imagery data defining a plurality of fourth images associated with said plurality of second spectral bands and having said third spatial resolution, said plurality of fourth images based on said plurality of second images, said reflectance ratio function, and said facet orientation providing valid facet orientation values;

down-sampling said plurality of fourth images to said second spatial resolution; and generating a plurality of radiance ratio functions at said second resolution associated with each of said second spectral bands, each of said plurality of radiance ratio functions comprising a ratio of said imagery data for a one of said plurality of fourth images at said second spatial resolution and a one of said plurality of second images at said second spatial resolution associated with a one of said plurality of second spectral bands;

upscaling said plurality of radiance ratio functions to said third spatial resolution to provide a plurality of up-sampled radiance ratio functions;

applying said plurality of up-sampled radiance ratio functions to said plurality of first reflectance functions at said third spatial resolution to produce said plurality of fourth reflectance functions.

* * * * *